April 29, 1952     G. A. ESTEL, JR     2,594,892
COVER MEANS FOR PIT-MOUNTED VEHICLE LIFTS
Filed Aug. 22, 1949     2 SHEETS—SHEET 1
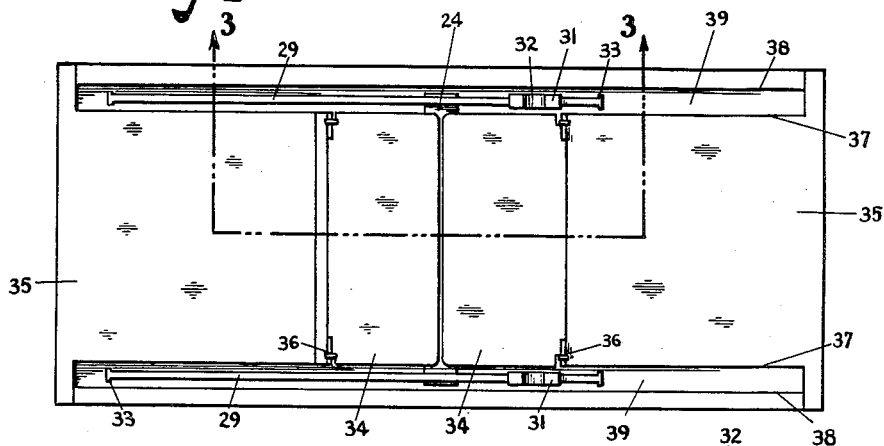
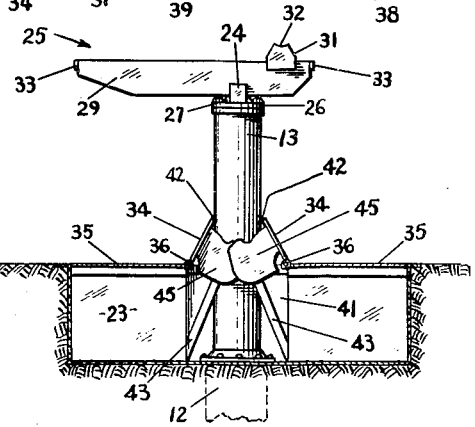
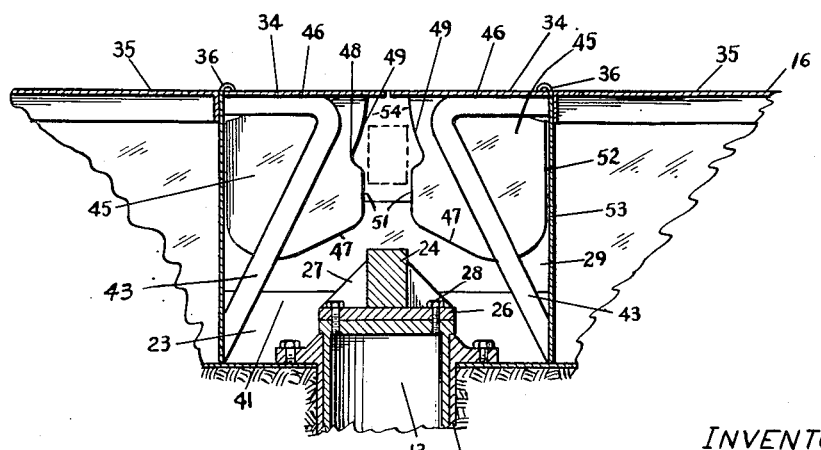
INVENTOR
George A. Estel, Jr.
By   Atty.

April 29, 1952  G. A. ESTEL, JR  2,594,892
COVER MEANS FOR PIT-MOUNTED VEHICLE LIFTS
Filed Aug. 22, 1949  2 SHEETS—SHEET 2

INVENTOR
George A. Estel, Jr.
By Rudolph L. Lowell
atty.

UNITED STATES PATENT OFFICE 2,594,892

COVER MEANS FOR PIT-MOUNTED VEHICLE LIFTS

George A. Estel, Jr., Des Moines, Iowa, assignor to Globe Hoist Company, Des Moines, Iowa, a corporation of Iowa Application August 22, 1949, Serial No. 111,689

4 Claims. (Cl. 254—89)

This invention relates generally to a vehicle hoist and in particular to a pit-mounted hoist in which hinged cover members for the pit are equipped with combination members which function as end guards for the pit, when the pit is elevated, and as guide members for directing the lift vehicle supporting structure within the pit, as the lift is lowered.

An object of this invention is to provide an improved vehicle hoist.

A further object of this invention is to provide a vehicle hoist of pit-mounted type in which hinged cover members for closing the pit have downwardly extended end plate members relatively assembled so as to be in an overlapping relation when the covers are in pit opening positions, whereby to form upright end guards at opposite ends of the pit.

Still another object of this invention is to provide a vehicle hoist of pit-mounted type having a lift member with a pair of upright transversely spaced longitudinally extended vehicle supporting members receivable in longitudinal floor openings, in which guide members receivable in the pit are movable upwardly from the pit, when the lift is elevated, to positions for engaging and moving the beam, as the lift is lowered, to a position at which the upright members are in longitudinal alignment with their corresponding floor openings.

A feature of this invention is found in the provision of a pit-mounted lift member having a transverse vehicle supporting member receivable within a transverse floor opening, in which the floor opening is closed by a pair of floor-hinged cover members, pivotally supported at opposite sides of the opening for opening movement away from each other. Each cover member carries a pair of transverse plate members, arranged at its opposite ends, and projected downwardly therefrom so as to be entirely within the floor opening when the cover members are in their closed positions. The plate members on one cover member are longitudinally offset relative to the plate members on the other cover member and of a length such that when the cover members are moved to open positions the adjacent end portions of the corresponding plate members at opposite ends of the cover members, are in an overlapping relation so that the pairs of corresponding plate members form upright guards at the ends of the floor opening. When the cover members are moved to closed positions, each corresponding pair of plate members is moved out of their overlapping relation and away from each other to provide for the passage of the transverse vehicle supporting member therebetween.

Yet another feature of this invention is found in the provision of a pit-mounted lift member having a vehicle supporting structure formed with a transverse beam member having flat upright longitudinally extended axle-engaging members at its opposite ends, in which the beam member and upright members are receivable in corresponding transverse and longitudinal openings formed in the floor surface. The transverse opening is closed by a pair of floor-hinged cover members movable away from each other to substantially upright positions. Projected downwardly from the ends of the cover members are guide members, which are movable upwardly between the cover members, on opening movement of the cover members, and positioned entirely within the transverse opening when the cover members are in closed positions. The guide members are formed with cam portions which, at the opened positions of the cover members, are engageable by the transverse beam member, as the lift member is lowered. Thus, should the transverse beam be in an inclined position out of longitudinal alignment with the transverse opening when the lift is to be lowered, the beam engages and is moved by the cam portions into longitudinal alignment with the transverse opening, with the cam portions having a shape to provide for a travel of the beam between the guide members concurrently with the movement of the cover members to closed positions. Since the upright axle-engaging members are fixed on the transverse beam, they are also moved into aligned positions with their associated floor openings by the guiding action of the cam portions on the transverse beam.

Further objects, features and advantages of this invention will become apparent from the following description when taken in connection with the accompanying drawings, in which:

Fig. 1 is a longitudinal sectional view of a pit-mounted two-post vehicle hoist which embodies the cover members of this invention, and with the lift members being shown in elevated positions;

Fig. 2 is an enlarged plan view of the rear lift member, illustrated in Fig. 1, showing the lift member in a lowered position and the cover members in closed positions;

Fig. 3 is an enlarged sectional view taken along the line 3—3 in Fig. 2;

Figure 4:
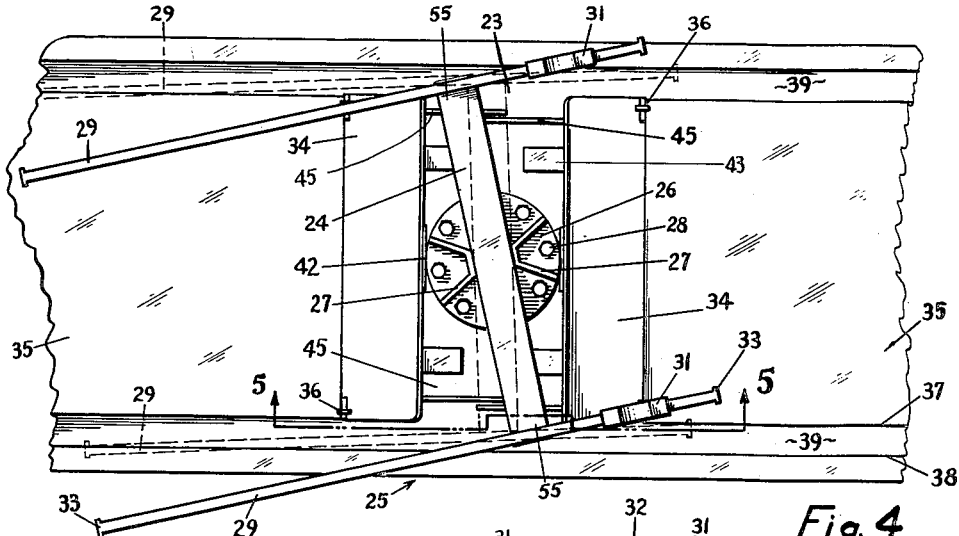
Fig. 4 is an enlarged plan view of the rear lift member, showing the lift member in an elevated position and rotated so that the vehicle supporting structure thereon is inclined longitudinally of the hoist.

With reference to the drawings, there is shown in Fig. 1 an automobile hoist of two-post type including front and rear hoists, with the front hoist having a cylinder 10 operatively associated with a piston or lift member 11, and the rear hoist including a cylinder 12 and associated piston 13. A suitable hydraulic system (not shown) of a conventional type may be used to accomplish either an independent or concurrent operation of the lift members 11 and 13. The front hoist is located in a pit 14 formed in a floor surface, indicated generally at 16, and includes a front axle supporting structure or saddle 17 fixed to the top of the piston 11. The pit 14 is of a size and shape such that the saddle member 17, at the lower most limit of travel of the piston 11, is received within the pit 14 below the surface of the floor 16.

With the saddle 17 thus located within the pit 14, the pit opening is automatically closed or covered by a pair of floor or cover plates 21 hinged at their outer sides 22 to opposite side walls of the pit opening for pivotal movement upwardly and away from each other to their open position, shown in Fig. 1, and for movement downwardly toward each other to a closed position supported on the angle supports 20.

When the piston 11 is initially raised, the cover plates 21 are pushed to their open positions by the saddle member 17. On a continued raising of the piston 11, the inner sides of the cover plates rest against the saddle member 17 and piston member 11 so as to be upwardly inclined toward each other, as shown in Fig. 1, to constitute side guards for the pit opening. This relative position of the cover plates 21 is maintained until the saddle member 17 is lowered into the pit 14, at which time the plates 21 follow the saddle member to their closed position. It is seen, therefore, that when the front hoist is at its lower limit of travel, it is located entirely within the pit 14, the opening of which is closed by the plates 21 to provide a floor surface over the pit continuous or flush with the floor 16. With the piston 11 in a raised position, the cover plates 21 are in substantially upright positions so as to prevent any accidental slipping by a person into the pit 14 from the sides thereof.

The rear hoist is mounted in a floor pit 23 and includes a rear axle supporting structure 25 (Figs. 1 and 4) having a transversely extended beam member 24 fixed onto a flange member 26 by means including a pair of oppositely arranged downwardly and outwardly inclined gusset or plate members 27. The flange member 26, in turn, is secured to the top of the piston 13 by screws or the like 28. Each end of the beam 24 carries a flat upright longitudinally extended axle-supporting member 29, with the ends of the beam 24 being fixed to a corresponding member 29 by welding so as to be substantially flush with the outer side surfaces of the flat upright members 29.

A rear axle-engaging block, indicated generally at 31, is slidably carried on the top edge of each upright supporting member 29 for movement longitudinally thereof to an axle-engaging position. The top edge of a member 29 is formed with an axle-receiving recess 32, with each end of a supporting member 29 being integrally formed with a stop 33 to limit the travel of a corresponding block 31 thereon.

The opening of the rear pit 23 is of a size and shape such that when the piston 13 is at its lower most limit of travel the rear axle-supporting structure is receivable therein at a position below the level of the floor 16. A closing of the pit 23, when the rear hoist is in either a lowered or raised position, is accomplished by the provision of means including a pair of fixed or permanent cover plates 35 and a pair of hinged cover plates 34.

The cover plates 34 are hinged at their outer sides, as indicated at 36, to the permanent cover plates 35, with the cover plates 34 being of a size such that in their open position the transverse beam 24 and lift member 13 are receivable therebetween. The sides 37 of the fixed floor plates 35 are spaced inwardly from an adjacent end wall 38 of the pit opening 23 so as to provide a pair of longitudinally extended openings 39 open intermediate their ends to opposite ends of the pit space 41, defined by the cover members 34 and side walls 53, which constitute supports for the inner ends of the fixed cover plates 35.

The cover plates 34, similarly to the front cover plates 21, are moved to their open positions by successive engagement with the transverse beam 24 and the piston 13, and are maintained in their open positions by the resting of their inner adjacent edges 42 against the lift member 13. In their closed positions the cover plates 34 are supported flush with the floor surface 16 by their engagement with plate supports 43 arranged within the pit space 41. The longitudinal openings 39 are of a relatively narrow width, and in the neighborhood of about two inches wide, so that these openings may be left uncovered at all times without creating any physical hazard to the hoist operator.

It is seen, therefore, that the cover members 21 for the front lift member 11 and the cover members 34 for the rear lift member 13 are moved to open positions by their respective lift members, and are maintained in open positions by the resting of their inner edges against the lift members, with the movement of the cover members to their closed positions taking place by the action of gravity in response to the lowering of the lift members 11 and 13 within their respective pits 14 and 41.

Further, the cover members 21 and 34, in open positions, constitute substantially upright side guard members for their respective pit openings 14 and 41 so as to prevent any accidental slipping by a person into the pit. To prevent any accidental slipping of a person into the pits 14 and 41, from the ends thereof, the cover members are provided with end guards 45. Since the end guards 45 on the cover members 21 and 34 are similar in construction and operation, only the end guards for the rear cover members 34 will be described in detail.

As shown in Figs. 3 and 4, each cover member 34 is provided with a pair of oppositely arranged guard members 45 which are of a flat plate construction and extend transversely of the cover members at positions projected downwardly from their lower sides. As best appears in Fig. 4, a pair of guard members 45 at the corresponding ends of the cover members 34 are offset from each other longitudinally of the cover members 34 to provide for their movement into overlapping positions for a purpose which will appear later.

The end guards 45 are of a like construction and of an irregular generally rectangular shape (Fig. 3), with the combined length of a pair of the end guards being greater than the transverse dimension of the pit opening or space 41, and with their combined width being less than the transverse dimension of the pit opening 41. Each end guard 45 has a flat side 46, hereinafter to be referred to as its upper side, which is secured as by welding to the lower side of an associated cover member 34. The lower side 47 of a guard member 45 is of a generally arcuate convex contour and the upper section of the inner side 48 of a guard member 45 is formed with a cam portion 49, the junction of which cam portion 49 and the lower side 47 is defined by a straight edge portion 51. The outer side 52 of a guard member 45 is of a straight shape adapted to rest against a side wall 53 of the pit opening 41, when the cover members 34 are in closed positions. With the cover members 34 closed (Fig. 3), the oppositely arranged guard members 45, at corresponding ends of the cover members 34, are in a spaced relation a distance apart to provide a passage 54 therebetween for the reception of the transverse beam 41.

In the operation of the guard members 45, and with the cover members 34 in their closed positions (Fig. 3), on elevation of the lift member 13, the beam 24 is moved upwardly through the passage 54, as indicated in dotted lines in Fig. 3, and engages the inner adjacent edges 42 of the cover members to move them upwardly. On travel of the beam 24 out of engagement with the cover members 34, the cover members are moved to their open positions by their successive engagement with the braces 27 and lift member 13.

During this upward movement of the cover members 34, the lower sides 47 of a corresponding pair of guard members 45, are moved into an overlapping relation, so that when the cover members 34 are in their full open position, as shown in Fig. 1, each corresponding pair of guard members 45 extend longitudinally in a direction transversely of the pit opening 41 so as to form a continuous upright guard at the end of the pit 41. The pit 41 is thus completely fenced in or guarded by the cover members 34 and their associated end guards 45.

On lowering of the lift 13 within the pit opening 41, the contour of the inner sides 48 of the guard members 45 provide for their being moved into a transversely spaced relation to permit a free passage of the beam 24 therebetween through the passage 54.

In the use of a hoist of this type, it often times occurs that the lift member 13 may be rotated to a position at which the beam 24 and upright members 29 are out of longitudinally aligned positions with their respective pit openings 41 and 39. When this occurs, it is necessary to manually move the axle supporting structure into longitudinal alignment prior to lowering the lift member 13.

By virtue of the cam portions 49, this manual actuation of the vehicle supporting structure is entirely eliminated for any tilted position of the beam 24 within the transverse dimension of the space formed between the upper adjacent edges 42 of the cover members 34, when the cover members 34 are in their open positions.

Figure 5:
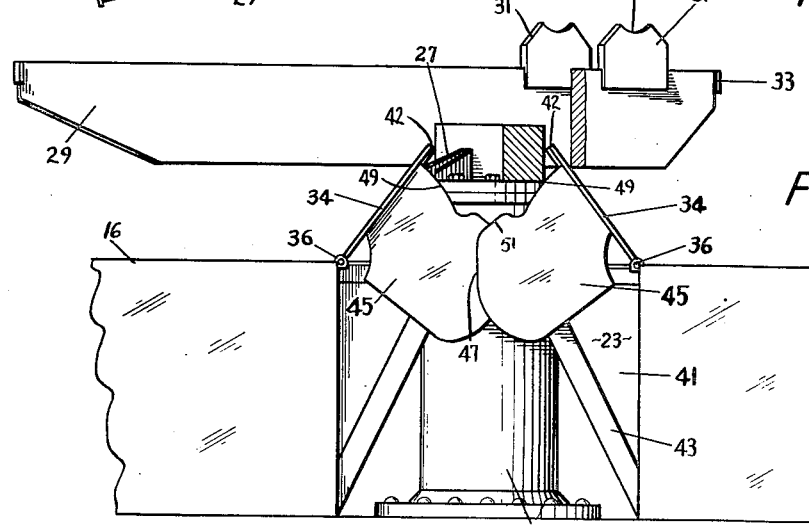
Fig. 5 is a sectional view taken along the line 5—5 in Fig. 4.

Thus let it be assumed that the beam member 24 is in its full-line position, shown in Fig. 4, at which both the beam 24 and its upright members 29 are out of longitudinally aligned positions with their respective pit openings 41 and 39. On lowering of the lift member, the opposite ends 55 of the beam 24 concurrently engage the cam portions 49, as shown in Fig. 5. Since the engaging force of the beam 24 with the cam portions 49 acts in a direction to close the cover members 34, the cover members 34 are restrained against movement to their closed positions by the action of gravity so as to be movable to their closed position at a rate commensurate with the travel of the beam 24 along the cam portions 49. Since the cam portions 49, acting on the beam 24 are reversely inclined relative to each other, they cooperate with each other to move the beam 24 into a longitudinally aligned position relative to the pit opening 41.

Figure 6:
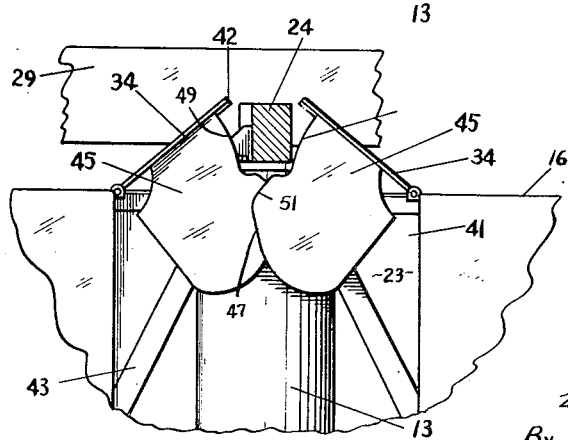
Fig. 6 is a sectional view illustrated similarly to Fig. 5 but showing the vehicle supporting structure and pit cover members in changed positions.

This guiding action of the cam portions 49 is successively shown in Figs. 5 and 6 which correspond respectively to the full-line and dotted-line showings in Fig. 4 of the axle-supporting structure. It is apparent, therefore, that with the upright members 29 fixed to the ends of the beam 24, the upright members are moved into longitudinal alignment with their corresponding pit openings 39 concurrently with the movement of the beam 24 into longitudinal alignment with the pit opening 41.

As shown in Fig. 6, when the beam 24 approaches its longitudinally aligned position, the cam portions 49 move out of engagement therewith so that closing movement of the covers 34 take place independently of any action thereon by the beam 24 and the end guards 45 are moved away from each other to permit the travel of the beam 24 therethrough.

From a consideration of the above description it is seen that the invention provides a cover means for a pit opening which is automatically opened and closed in response to the raising and lowering movements of a lift member, and with the cover means in closed position being in a substantially flush relation with a floor surface to provide an unobstructed normal use of the floor space occupied by the hoist, and in their open positions constituting side guards and end guards about the pit opening so as to prevent any accidental slipping of a person within the pit. Further, the end guards 45 associated with the cover members 34 constitute means for guiding the vehicle supporting structure of the lift into longitudinally aligned positions with its associated floor opening whereby to accomplish a positive and automatic lowering of the lift and its supporting structure within a floor pit. Although the operation of the side guards 45 has been described and illustrated relative to only the rear covers 34 and beam 24, it is to be understood that this operation is similar in all respects to the operation of the end guards 45 for the front covers 21 relative to the saddle structure 17.

Further, although the invention has been described and illustrated with respect to a preferred embodiment thereof, it is to be understood that it is not to be so limited since changes can be made therein which are within the full-intended scope of this invention, as defined by the appended claims.

I claim:

1. In a vehicle lift including a lift member mounted in a floor pit and movable to a lowered position within said pit below the level of the floor surface, an axle supporting structure carried at the upper end of said lift member including a transverse beam member, said floor surface having a transverse opening therein adapted to receive said beam member therethrough, a pair of hinged cover members for closing said transverse opening pivotally supported on said floor surface at opposite sides of said opening for pivotal movement toward each other to closing positions, plate members arranged adjacent the opposite ends of each cover member and projected downwardly therefrom, with the plate members at corresponding ends of said cover members being offset longitudinally of said cover members and of a combined length greater than the width of said opening so as to be in an overlapping relation when the cover members are in open positions whereby to form end guards for such opening, said plate members, at corresponding ends of said cover members, having a combined width less than the width of said opening to provide a space therebetween for the reception of said transverse beam, when said cover members are moved to their closed positions.

2. In a vehicle lift including a lift member mounted in a floor pit and movable to a lowered position within said pit below the level of the floor surface, an axle supporting structure carried at the upper end of said lift member comprising a transverse beam member, a pair of oppositely arranged longitudinally extended upright plate members fixed on said beam, said floor surface being formed with a transverse opening to receive said beam member therethrough, and a pair of longitudinally extended openings open to said transverse opening for receiving said upright members, a pair of hinged cover members for closing said transverse opening pivotally supported on said floor surface at opposite sides of said transverse opening for pivotal movement toward each other to closing positions, and means for guiding said beam member and said plate members within their respective floor openings, when said axle supporting structure is inclined longitudinally of the vehicle lift, comprising guide members supported from opposite ends of said cover members and movable upwardly therebetween when said cover members are moved to open positions, said guide members being engaged by said transverse beam member, on lowering movement thereof between said open cover members, to move said beam member into a position extended longitudinally of said transverse opening, whereby said plate members are moved into aligned positions with said longitudinal openings for reception therein.

3. In a vehicle lift including a lift member mounted in a floor pit and movable to a lowered position within said pit below the level of the floor surface, an axle supporting structure carried at the upper end of said lift member including a transverse beam member, said floor surface having a transverse opening therein to receive said beam member therethrough, means for moving said beam into an aligned position with said opening, on lowering of said lift member, for reception within said opening comprising guide means at opposite ends of said opening movable up and down in response to the lowering and raising of said lift member, with each of said guide means including portions spaced transversely of said opening and engageable by said beam, when the beam is inclined out of longitudinal alignment with the opening, to move said beam into longitudinal alignment with said opening.

4. In a vehicle lift including a lift member mounted in a floor pit and movable to a lowered position within said pit below the level of the floor surface, an axle supporting structure carried at the upper end of said lift member including a transverse beam member, said floor surface having a transverse opening therein to receive said beam member therethrough, a pair of floor-hinged cover members for closing said opening pivotally supported at opposite sides of said opening and movable away from each other to substantially upright open positions so as to constitute side guards for said opening, and end guards for said opening including a pair of plate members of an irregular shape supported from the lower side of each cover member in a spaced relation longitudinally of the cover members, with the plate members on one cover member being offset longitudinally relative to the corresponding plate members on the other cover member to provide for the adjacent end portions of said corresponding plate members being in an overlapped relation when said cover members are in open positions, said adjacent end portions having marginal contours such that as the cover members are moved to closed positions therefor, said corresponding plate members are moved away from each other to provide a passage therebetween for receiving said beam member.

GEORGE A. ESTEL, Jr.

REFERENCES CITED

The following references are of record in the file of this patent:

UNITED STATES PATENTS

| Number | Name | Date |
|---|---|---|
| 1,530,513 | Pavella | Mar. 24, 1925 |
| 2,443,405 | Thompson | June 15, 1948 |